(12) United States Patent
Aikawa (10) Patent No.: US 9,880,410 B2
(45) Date of Patent: Jan. 30, 2018

(54) DISPLAY APPARATUS

(71) Applicant: Sakai Display Products Corporation, Sakai-shi, Osaka (JP)

(72) Inventor: Yasuyuki Aikawa, Sakai-shi (JP)

(73) Assignee: Sakai Display Products Corporation, Sakai-shi, Osaka (JP)

(*) Notice: Subject to any disclaimer, the term of this patent is extended or adjusted under 35 U.S.C. 154(b) by 0 days.

(21) Appl. No.: 15/038,241

(22) PCT Filed: Nov. 26, 2013

(86) PCT No.: PCT/JP2013/081720
§ 371 (c)(1),
(2) Date: May 20, 2016

(87) PCT Pub. No.: WO2015/079480
PCT Pub. Date: Jun. 4, 2015

(65) Prior Publication Data
US 2016/0291390 A1    Oct. 6, 2016

(51) Int. Cl.
*H05K 9/00* (2006.01)
*G02F 1/1333* (2006.01)

(52) U.S. Cl.
CPC .......... *G02F 1/133308* (2013.01); *G02F 2001/13332* (2013.01); *G02F 2001/133334* (2013.01); *G02F 2201/46* (2013.01)

(58) Field of Classification Search
CPC ..... G02F 1/133308; G02F 2001/13332; G02F 2001/133334; G02F 2201/46

USPC .................................................. 361/816, 818
See application file for complete search history.

(56) References Cited

U.S. PATENT DOCUMENTS

| 7,859,608 B2 * | 12/2010 | Fukuda | G02F 1/13452 349/58 |
| 9,291,853 B2 * | 3/2016 | Maruno | G02F 1/133608 |
| 2005/0151894 A1 * | 7/2005 | Katsuda | G02F 1/133308 349/58 |
| 2013/0141943 A1 * | 6/2013 | Yu | G02F 1/133608 362/627 |

FOREIGN PATENT DOCUMENTS

JP    2012-021203 A    2/2012

* cited by examiner

*Primary Examiner* — Hung S Bui
(74) *Attorney, Agent, or Firm* — Rudy J. Ng; Bret E. Field; Bozicevic, Field & Francis LLP (57) ABSTRACT

A bezel abutting a peripheral edge of a display region of a liquid crystal panel having the display region on one surface, and a BL chassis holding the liquid crystal panel from the other surface side of the liquid crystal panel are fastened to each other by a plurality of fastening members to form a housing. Each of the fastening members is selected from a plurality of types of the fastening members having different electrical resistance values for each fastening location so that a resonance frequency of the housing does not coincide with a frequency of the electromagnetic wave noise radiated from the housing.

9 Claims, 9 Drawing Sheets

DISPLAY APPARATUS

CROSS-REFERENCE TO RELATED APPLICATION

This application is the national phase under 35 U.S.C. § 371 of PCT International Application No. PCT/JP2013/081720 which has an International filing date of Nov. 26, 2013 and designated the United States of America.

BACKGROUND

1. Technical Field

The present invention relates to a display apparatus in which a bezel abutting a peripheral edge of one surface of a display panel and a chassis holding the display panel from the other surface side are fastened to each other by screws.

2. Description of Related Art

Display apparatuses such as a liquid crystal display and a liquid crystal television have been widely distributed. The display apparatus includes a display panel having a display surface for displaying an image on one surface. In addition, the display apparatus has often a configuration in which a bezel abutting a peripheral edge of the display surface from the one surface side of the display panel and a chassis holding the display panel from the other surface side are fastened to each other by screws to form a housing. Further, the display apparatus performs various types of signal processing during displaying an image on the display panel, and an electronic circuit for performing the various types of signal processing and a printed board on which the electronic circuit is mounted are appropriately disposed in the housing. The housing formed by the bezel and the chassis is often made of metal.

Recently, in the display apparatus, the number of pixels is increased depending on an increase in the size of a screen and enhancement of image quality, and the multifunctionality thereof such as a double-speed display or quad-speed display that displays an image by adding an interpolation frame between respective image frames has been progressed. Accordingly, signals that should be processed by the display apparatus are increased, and a processing speed of the signal processing by the display apparatus is accelerated. When the signal is transmitted at a high speed by wiring patterns formed on the printed board, harmonics are generated, which become a noise current to be leaked out from the printed board (wiring patterns). In addition, when the noise current has reached the bezel or the chassis, an electromagnetic wave noise is radiated to an outside of the display apparatus through the bezel or the chassis serving as an antenna. In this case, when a frequency of the electromagnetic wave noise and a resonance frequency of the bezel or the chassis coincide with each other, an amount of radiation of the electromagnetic wave noise is increased.

The electromagnetic wave noise radiated from the display apparatus (hereinafter, referred to as an electromagnetic interference (EMI)) may affect other surrounding electronic equipment or a human body, such that it is necessary to suppress the EMI. Therefore, in Japanese Patent Application Publication No. 2012-27203, a configuration in which washers having a lower electrical conductivity than the bezel and the chassis are interposed between the bezel or chassis and the screws has been proposed. In such the configuration, even when the noise current is conducted from the printed board to the bezel or the chassis and electromagnetic resonance occurs, a resonance energy is converted into a heat energy by the washers to be consumed, and thereby the EMI may be suppressed.

SUMMARY

However, in the configuration of interposing the washers between the bezel or chassis and the screws, since it is only possible to select whether the washer is interposed for each screw, there is a limit to an effect of suppressing the EMI. In addition, due to interposing the washer, a fastening strength by the screws may be decreased. Further, since head portions of the washer and the screw protrude from an outer surface of the bezel or the chassis, a length of protrusion portions (projections) becomes longer.

The present invention has been made with the aim of solving the above problems. It is an object of the present invention to provide a display apparatus capable of suppressing EMI by adjusting a resonance frequency in a housing.

A display apparatus according to one embodiment of the present invention comprises a display panel having a display region to display an image on one surface thereof, a holding member which holds the display panel from the other surface side of the display panel, a frame member which abuts a peripheral edge part of the one surface of the display panel, and a plurality of fastening members which fasten the holding member and the frame member. The fastening members comprise a plurality of types of fastening members having different electrical resistance values from each other.

According to the embodiment of the present invention, the holding member which holds the display panel having the display region on one surface thereof from the other surface side and the frame member which abuts the peripheral edge part of the one surface of the display panel are fastened by the plurality of fastening members. As the plurality of fastening members, the plurality of types of fastening members having different electrical resistance values from each other are used in combination with each other. A resonance frequency in a housing formed by fastening the holding member and the frame member by the fastening members is affected by not only electrical resistance values of the holding member and the frame member, but also electrical resistance values of the fastening members. Thereby, by fastening the holding member and the frame member by the plurality of fastening members having different electrical resistance values from each other, it is possible to configure in such a way that the resonance frequency of the housing does not coincide with a frequency of an electromagnetic wave noise radiated from the display apparatus. Generally, an electric equipment such as the display apparatus has different resonance frequencies depending on components (a printed board, and the like) housed in the housing, a combination of the respective components, and an arrangement position thereof. Also, in such the electric equipment, by selecting the electrical resistance values of the respective fastening members to be used, the resonance frequency can be finely adjusted, and an adjustable range is widened. Thereby, also in the display apparatus having any configuration, it is possible to suppress an EMI by using the fastening members suitable for each display apparatus.

In the display apparatus according to the embodiment of the present invention, it is preferred that the plurality of types of fastening members are made of different materials from each other.

According to the preferred embodiment of the present invention, the plurality of types of fastening members having different electrical resistance values are achieved by the fastening members made of different materials from each other. Thereby, it is possible to achieve the fastening members having various electrical resistance values depending on the materials used therein.

In the display apparatus according to the embodiment of the present invention, it is preferred that the fastening members are provided at a plurality of fastening locations along the frame member, respectively, and the type of the fastening members of each location on the one end side of the frame member is different from the type of the fastening members of the other locations.

According to the preferred embodiment of the present invention, the holding member and the frame member are fastened by the fastening members at the plurality of fastening locations along the frame member. In addition, the type of the fastening members to be fastened at each location on the one end side of the frame member is different from the type of the fastening members to be fastened at the other locations. By such the configuration, in a display apparatus having an electromagnetic wave noise radiated from the one end side of the frame member larger than the electromagnetic wave noise radiated from the other end side, it is possible to achieve the configuration capable of appropriately suppressing the electromagnetic wave noise (EMI).

In the display apparatus according to the embodiment of the present invention, it is preferred that the holding member and the frame member are made of a conductive member.

According to the preferred embodiment of the present invention, in the display apparatus in which the holding member and the frame member are made of the conductive member, it is possible to achieve the configuration capable of appropriately suppressing the EMI.

According to one embodiment of the present invention, by changing the electrical resistance values of the respective fastening members which fasten the holding member and the frame member, it is possible to adjust the resonance frequency in the housing, and suppress the EMI. In addition, as compared to the configuration of interposing the washers between the bezel (frame member) or chassis (holding member) and the screws (fastening members), it is possible to obtain an effect in which a decrease in the fastening strength due to the fastening members does not occur, and locations where the fastening members protrude from the frame member or the holding member can be formed to be short by as much as a level with no washer interposed therebetween.

The above and further objects and features will more fully be apparent from the following detailed description with accompanying drawings.

DETAILED DESCRIPTION

Figure 1:
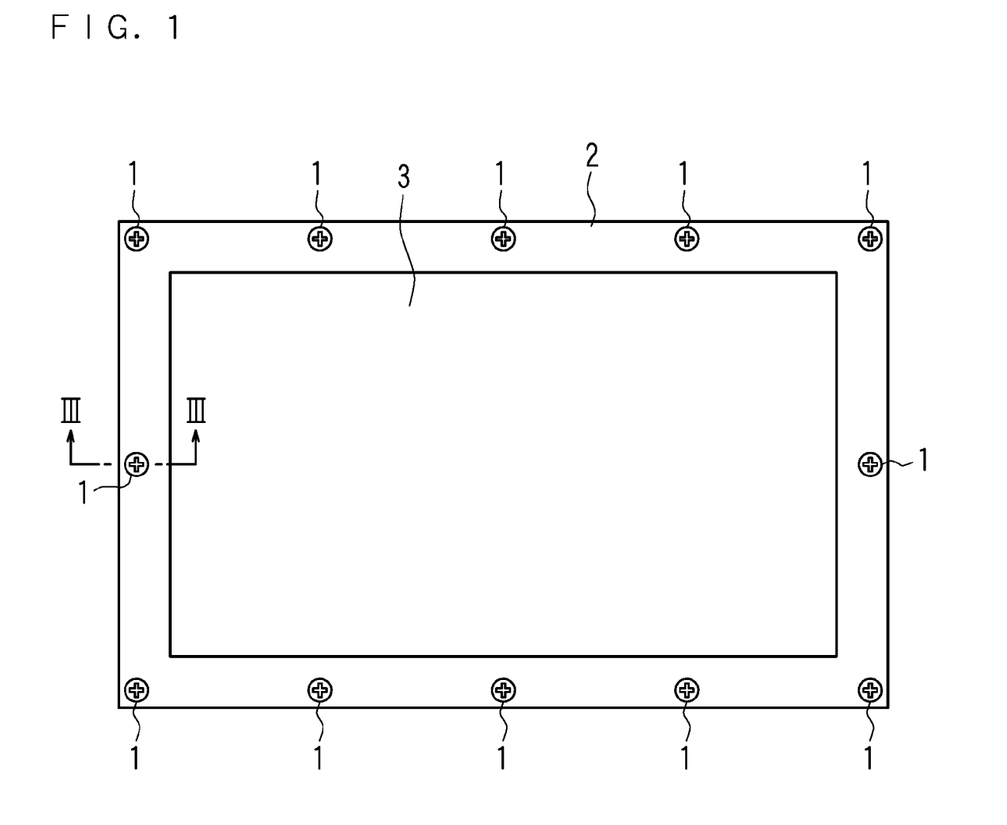
FIG. 1 is a front view of a display apparatus according to an embodiment.
Figure 2:
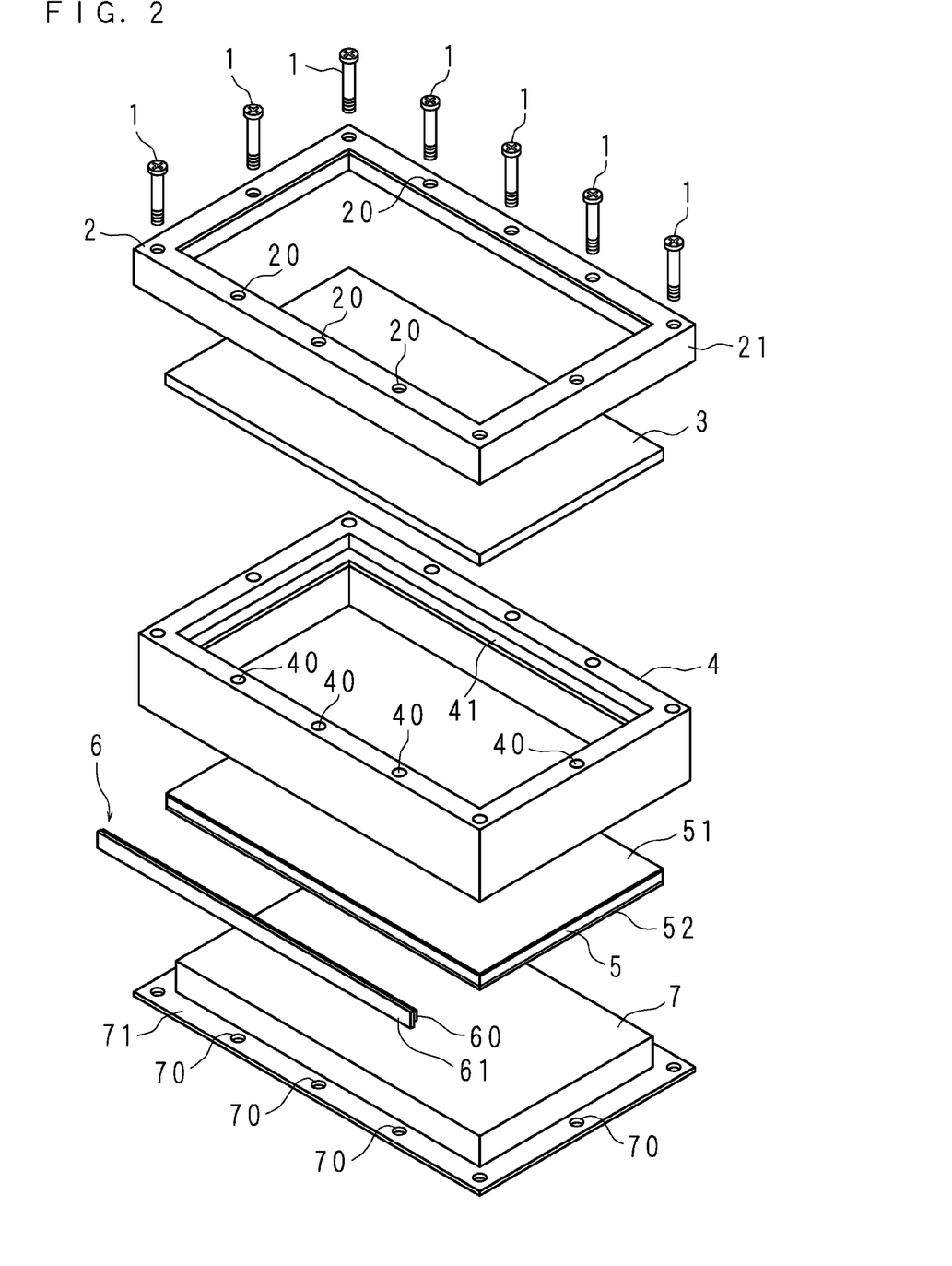
FIG. 2 is an exploded perspective view illustrating a configuration of major parts of the display apparatus according to the embodiment.
Figure 3:
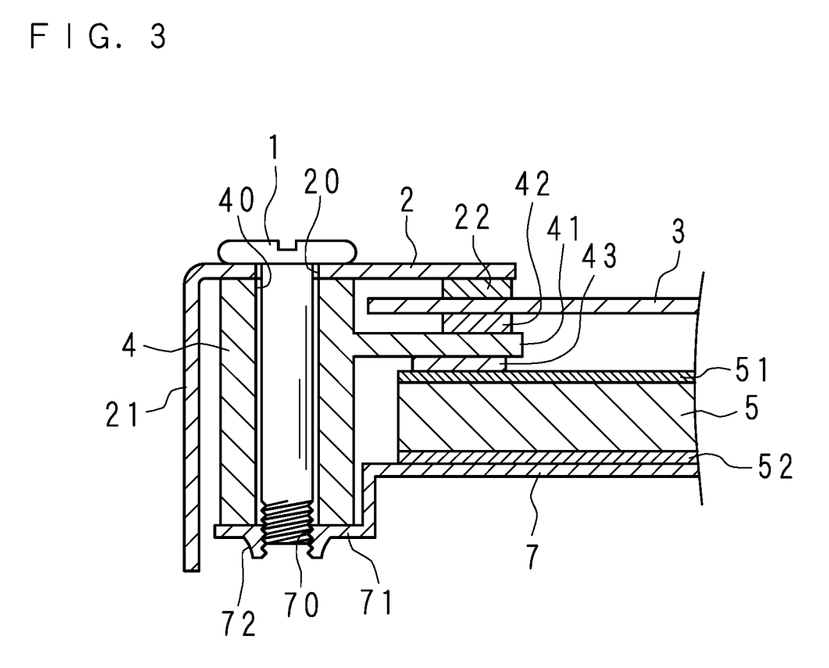
FIG. 3 is a cross-sectional view taken on line III-III of FIG. 1.

Hereinafter, a display apparatus according to the present invention will be described in detail with reference to the accompanying drawings illustrating the embodiments thereof. FIG. 1 is a front view of a display apparatus according to the embodiment, FIG. 2 is an exploded perspective view illustrating a configuration of major parts of the display apparatus according to the embodiment, and FIG. 3 is a cross-sectional view taken on line III-III of FIG. 1. As illustrated in FIG. 2, the display apparatus of the embodiment is formed in such a way that a bezel (frame member) 2, a liquid crystal panel (display panel) 3, a panel chassis 4, a light guide plate 5, a light source unit 6 and a backlight chassis (hereinafter, referred to as a BL chassis or a holding member) 7 are overlapped in this order, and fastened by a plurality of fastening members (screws) 1.

The bezel 2 is a rectangular frame member (conductive member) made of metal, and has a plate part 21 which vertically protrudes from an outer peripheral edge thereof. In addition, the bezel 2 includes a panel pressing part 22 (see FIG. 3) provided on a surface of the protrusion side of the plate part 21 along an opening portion to abut the liquid crystal panel 3 as described below, and a plurality of through holes 20 provided at an outside of the panel pressing part 22.

The liquid crystal panel 3 is a rectangular liquid crystal display panel, and has a rectangular display screen (display region) on one surface thereof to display an image.

The panel chassis 4 is a rectangular frame member made of a resin, and is provided with a plurality of through holes 40 which penetrate in a thickness direction. The panel chassis 4 has a slightly smaller size than the bezel 2, and the through holes 40 are provided at positions corresponding to the through holes 20 of the bezel 2. In an example illustrated in FIGS. 1 and 2, the through holes 20 and 40 are provided by three in a short side and by five in a long side at an equal interval, respectively, but the number of the through holes 20 and 40 is not limited thereto, and a distance between the adjacent through holes 20 and 20, and 40 and 40 is not limited to the equal interval. In addition, the panel chassis 4 has a plate part 41 formed so as to protrude inward from the inner peripheral surface thereof, and the plate part 41 has a panel pressing part 42 (see FIG. 3) provided on one surface thereof along the opening portion to abut the liquid crystal panel 3 as described below. Further, the panel pressing part 42 of the plate part 41 has a sheet pressing part 43 (see FIG.

3) provided on a rear surface side thereof to abut an optical sheet 51 provided on one surface of the light guide plate 5.

The light guide plate 5 is made of a synthetic resin such as a high transparency acrylic resin, or polycarbonate resin, and is formed in a rectangular plate shape. The light guide plate 5 has the optical sheet 51 adhered to one surface thereof, and a reflection sheet 52 adhered to the other surface thereof. The reflection sheet 52 is a sheet made of a synthetic resin having high reflecting properties. The optical sheet 51 is a sheet in which a diffusion sheet, prism sheet, polarizing sheet, and the like are laminated, for example. The diffusion sheet is, for example, a film made of polyethylene terephthalate (PET) or a film made of a polycarbonate resin, and has a function to diffuse light made incident thereon. The prism sheet is formed by, for example, molding regular prism patterns with an acryl resin on one surface of a sheet material made of polyester. The polarizing sheet is, for example, a film made of polyethylene terephthalate, and has a function to convert the light made incident thereon into a linearly polarized light. Further, the optical sheet 51 is not limited to the configuration of being adhered to the one surface of the light guide plate 5, and may have a configuration of being held at an appropriated interval from the one surface of the light guide plate 5.

The light source unit 6 has a strip-shaped substrate 61, and a plurality of light sources 60 mounted on one surface of the substrate 61. The light sources 60 are, for example, light emitting diodes (LEDs), and are arranged in a longitudinal direction of the substrate 61. The light source unit 6 may have a configuration of using a cold cathode fluorescent lamp (CCFL), an external electrode fluorescent lamp (EEFL), a hot cathode fluorescent lamp (HCFL), or the like.

The light source unit 6 is disposed to face a lower end surface of the light guide plate 5 so that the light from the light sources 60 is made incident thereon. The display apparatus may include two light source units 6, and in the case of including two light source units, for example, the light source units may be disposed to face right and left end surfaces of the light guide plate 5, respectively, or may be disposed to face upper and lower end surfaces, respectively.

The BL chassis 7 is a metallic member (conductive member) having a rectangular dish shape, and has a flange part 71 provided at the opening portion thereof to protrude outward. The flange part 71 has a plurality of convex parts 72 (see FIG. 3) which protrude to the opening side of the BL chassis 7, and each of the convex parts 72 is provided with a screw hole 70 having a screw at an inner periphery thereof. The flange part 71 of the BL chassis 7 has an outer diameter substantially the same as the outer diameter of the panel chassis 4, and the convex parts 72 are provided at positions corresponding to the through holes 40 of the panel chassis 4 and the through holes 20 of the bezel 2. Thereby, the number of the convex parts 72 is not limited to the number illustrated in FIG. 2.

As illustrated in FIG. 3, the display apparatus of the embodiment is formed in such a way that the light guide plate 5 is placed on a bottom plate of the BL chassis 7, the panel chassis 4 is covered thereon, the liquid crystal panel 3 is placed on the panel chassis 4, and the bezel 2 is covered thereon, and then the bezel 2, the panel chassis 4 and the BL chassis 7 are fastened by the fastening members 1. Further, although not illustrated in FIG. 3, in the bottom plate of the BL chassis 7, the light source unit 6 is attached at a position facing the lower end surface of the light guide plate 5.

In the display apparatus having the above-described configuration, the bezel 2 covers the liquid crystal panel 3 from the display screen side by abutting the panel pressing part 22 the peripheral edge of the display screen of the liquid crystal panel 3. Further, the liquid crystal panel 3 has an outer diameter substantially the same as or slightly larger than the outer diameter of the panel pressing part 22 of the bezel 2. Accordingly, when the panel pressing part 22 abuts the liquid crystal panel 3, the liquid crystal panel 3 is not overlapped on the through holes 20 of the bezel 2.

The panel chassis 4 is located inside of the plate part 21 of the bezel 2, with the through holes 40 thereof being continued to the through holes 20 of the bezel 2. The panel pressing part 42 of the panel chassis 4 abuts the rear surface side of the liquid crystal panel 3 at a location abutting the panel pressing part 22 of the bezel 2.

The light guide plate 5 is disposed such that the optical sheet 51 faces a back surface (the rear surface of the display screen) of the liquid crystal panel 3 abutting the panel pressing part 42 of the panel chassis 4, and the peripheral edge of the optical sheet 51 abuts the sheet pressing part 43 of the panel chassis 4. Further, the light guide plate 5 abuts the bottom plate of the BL chassis 7 through the reflection sheet 52, with the optical sheet 51 abutting the sheet pressing part 43 of the panel chassis 4. Further, in a space between the plate part 41 of the panel chassis 4 and the BL chassis 7, the light source unit 6 is provided at a position facing the lower end surface of the light guide plate 5. When the bottom plate of the BL chassis 7 abuts the reflection sheet 52, the flange part 71 of the BL chassis 7 abuts the lower end surface of the panel chassis 4, with the screw holes 70 of the convex part 72 being continued to the through holes 40 of the panel chassis 4.

The fastening member 1 passes through the through hole 20 of the bezel 2 and the through hole 40 of the panel chassis 4 from the display screen side of the display apparatus, and is screwed to the screw hole 70 of the BL chassis 7 to fasten the bezel 2, the panel chassis 4 and the BL chassis 7. When fastening by the fastening members 1, the BL chassis 7 pinches the light guide plate 5 between the panel chassis 4 and holds the light source unit 6, and the bezel 2 pinches the liquid crystal panel 3 between the panel chassis 4.

By the above-described configuration, in the display apparatus of the embodiment, light emitted from the light source unit 6 (light sources 60) is made incident on the light guide plate 5 from the lower end surface thereof, and is reflected by the reflection sheet 52, and then passes through the light guide plate 5 and the optical sheet 51, such that the liquid crystal panel 3 is irradiated with uniform flat light.

Figure 4:
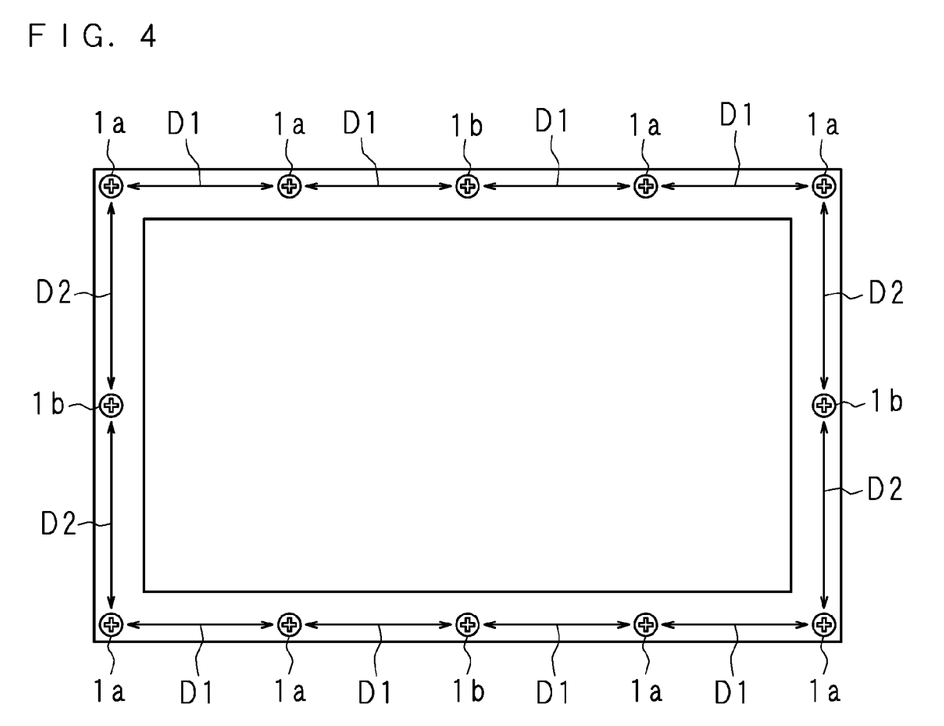
FIG. 4 is a schematic view illustrating an example of a combination of a plurality of fastening members.

In the embodiment, a plurality of types of fastening members having different electrical resistance values are prepared, and the respective fastening members 1 are determined for each place (fastening location) to be attached. That is, the plurality of fastening members 1 are used by combining the fastening members having different electrical resistance values for each fastening location. FIG. 4 is a schematic view illustrating an example of a combination of the plurality of fastening members 1. In the example illustrated in FIG. 4, each of the long sides of the bezel 2 is provided with the fastening locations at five locations at a distance D1, and each of the short sides is provided with the fastening locations at three locations at a distance D2. In addition, a center of five locations of each long side of the bezel 2 and a center of three locations of each short side are fastened by the fastening members 1b, and the other locations are fastened by the fastening members 1a. The fastening member 1a and the fastening member 1b have different electrical resistance values from each other. The fastening member 1a is made of, for example, a material having an electrical resistivity of 10 $\mu\Omega cm$, and the fastening member 1b is made of, for example, a material having an electrical resistivity of 0.01 μΩcm. The fastening members 1a and 1b are formed in the same shape as each other with materials having different electrical resistivities (that is, different materials), such that the electrical resistance values in the fastening members 1a and 1b are different from each other.

By fastening the bezel 2, the panel chassis 4 and the BL chassis 7 by the fastening members 1a and 1b, the bezel 2 and the BL chassis 7 form a housing of the display apparatus. The resonance frequency in the housing formed by the bezel 2 and the BL chassis 7 is affected by the electrical resistance values of the fastening members 1a and 1b. Thereby, by changing the fastening members 1a and 1b attached to each fastening location, the resonance frequency in the housing may be adjusted. Accordingly, by determining the fastening members 1a and 1b to be attached to each fastening location so that the resonance frequency of the housing does not coincide with a frequency of an electromagnetic wave noise radiated from the display apparatus, the EMI from the display apparatus can be suppressed.

It is preferable that the electromagnetic wave noise radiated during an operation of the display apparatus (test operation) after assembling is measured, and the fastening members 1a and 1b to be attached to each fastening location are determined depending on the measured electromagnetic wave noise. The resonance frequency in the housing is also affected by a distance between the adjacent fastening members 1a and 1b (the distance between the fastening locations). Accordingly, the electromagnetic wave noise radiated from the actually assembled display apparatus includes an influence due to the distance between the adjacent fastening members 1a and 1b, and it is possible to achieve a configuration capable of suppressing the EMI by determining the respective fastening members 1a and 1b depending on the measured electromagnetic wave noise. Further, it is possible to determine that, in the display apparatus of the same model (model number), types of components and arrangement places of the respective components are the same as each other, and the radiated electromagnetic wave noises are also the same as each other. Thereby, measuring of the electromagnetic wave noise and determining of the combination of the fastening members 1a and 1b with respect to one model may be performed once, and with respect to the display apparatus of the same model, the EMI can be suppressed by using the fastening members 1a and 1b of the same combination.

Figure 5A:
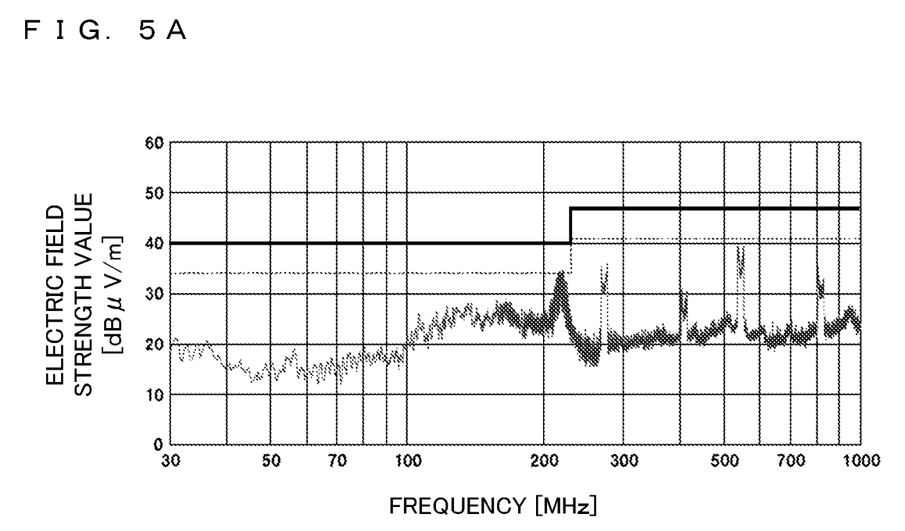
FIG. 5A is a graph illustrating an amount of radiation of the electromagnetic wave noise from the display apparatus.
Figure 5B:
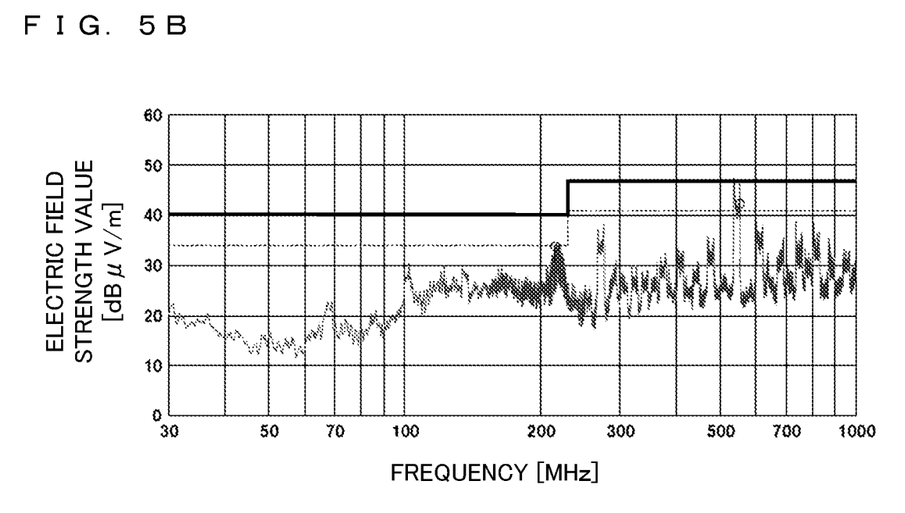
FIG. 5B is a graph illustrating an amount of radiation of the electromagnetic wave noise from the display apparatus.

FIGS. 5A and 5B are graphs illustrating an amount of radiation of the electromagnetic wave noise from the display apparatus. FIG. 5A illustrates the amount of radiation of the electromagnetic wave noise from the display apparatus using the fastening members 1a and 1b as illustrated in FIG. 4, and FIG. 5B illustrates the amount of radiation of the electromagnetic wave noise from the display apparatus using the fastening members 1a at all the fastening locations. In FIGS. 5A and 5B, a horizontal axis shows the frequency [MHz], and a vertical axis shows an electric field strength value [dBμV/m] representing the amount of radiation of the electromagnetic wave noise. Further, in FIGS. 5A and 5B, a solid line shows a value (prescribed level) defined by, for example, an electro-magnetic compatibility (EMC) standard, and a broken line shows a design target value. Furthermore, the design target value is typically set by securing a margin of several dBμN/m (for example, 6 dBμN/m) with respect to the prescribed level.

As illustrated in FIG. 5B, in the display apparatus using the fastening members 1a at all the fastening locations, an electromagnetic wave noise exceeding the design target value is radiated at about 550 MHz. Compared with this, as illustrated in FIG. 5A, in the display apparatus using the fastening members 1b at four locations of the center of each side of the bezel 2, and using the fastening members 1a at the other locations, the radiation of the electromagnetic wave noise exceeding the design target value is suppressed.

In the display apparatus of the embodiment, by preparing the fastening members 1a and 1b having different electrical resistance values in advance, and appropriately selecting and using the fastening members 1 to be attached to each fastening location from the fastening members 1a and 1b, it is possible to finely adjust the resonance frequency of the housing. In addition, since an adjustable range is widened, it is possible to achieve the configuration capable of suppressing the EMI in the display apparatus having any configuration. The fastening members 1a and 1b are not limited to the two types, and it is possible to appropriately select and use any one from among the fastening members 1 having three types or more of different electrical resistance values. Further, since the fastening members 1a and 1b are formed in the same shape as each other, these members can be screwed to all of the through holes 20 and 40 and the screw holes 70. Furthermore, different types of the fastening members 1a and 1b may be formed in different colors from each other. In this case, the respective fastening members 1a and 1b having the same shape as each other may be identified by the color, such that it is possible to avoid attaching errors of the respective fastening members 1a and 1b.

In the display apparatus of the embodiment, by using the fastening members 1a and 1b having different electrical resistance values as the fastening members 1 to be attached to each fastening location, it is possible to achieve the configuration capable of suppressing the EMI by adjusting the resonance frequency of the housing. Thereby, as compared to the configuration of interposing the washers between the bezel or chassis and the screws as in the related art, a decrease in the fastening strength due to the fastening members 1a and 1b does not occur. In addition, the protrusion portions (head portions) of the fastening members 1a and 1b in a front surface of the bezel 2 can be formed to be short by as much as a level with no washer interposed therebetween, and the design thereof can be improved.

Figure 6A:
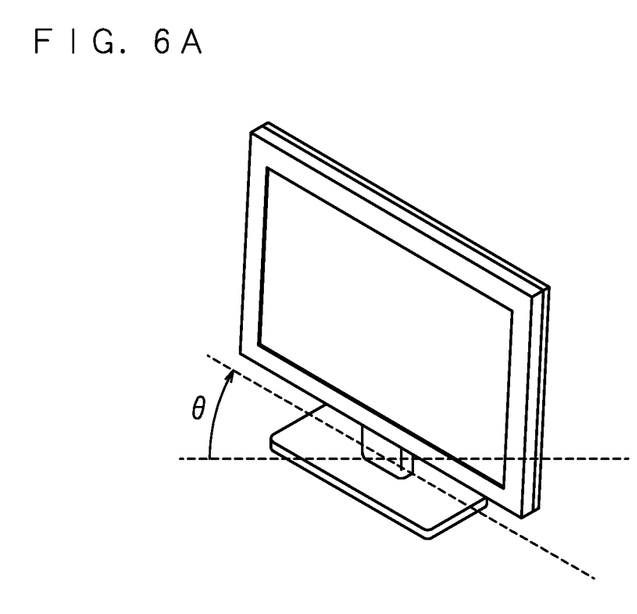
FIG. 6A is a schematic view for describing a method of measuring an electromagnetic wave noise radiated from the display apparatus.
Figure 6B:
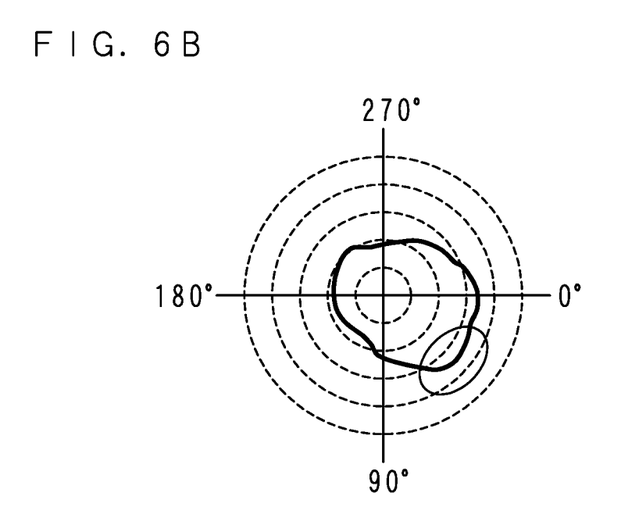
FIG. 6B is a strength distribution diagram of the electromagnetic wave noise.

Hereinafter, a detailed example of a method of determining a fastening member 1a or 1b to be attached to each fastening location will be described. FIG. 6A is a schematic view for describing a method of measuring an electromagnetic wave noise radiated from the display apparatus. The display apparatus is installed with the display screen being erected, and a measurement antenna for measuring a strength (the amount of radiation) of the electromagnetic wave is installed at a position separated from the display screen at about several meters (for example, 3 m). Then, the display apparatus is operated, and the electromagnetic wave noise radiated from the display apparatus is measured by the measurement antenna while sequentially changing an orientation of the display apparatus in a direction illustrated by an arrow in FIG. 6A. Further, in the method illustrated in FIG. 6A, the display apparatus is rotated in a clockwise direction when viewing the display apparatus from an upper side (i.e., a display orientation is changed). FIG. 6B is a strength distribution diagram of the electromagnetic wave noise, and illustrates, for the display apparatus in which all the fastening locations are fastened by the fastening members 1a, a strength distribution example of the electromagnetic wave noise measured by the method illustrated in FIG. 6A. In FIG. 6B, a circumferential direction of a circle illustrated by a broken line shows a rotation angle θ of the display apparatus, and a radial direction from a center of the circle shows the electric field strength value representing the amount of radiation of the electromagnetic wave noise.

Figure 6C:
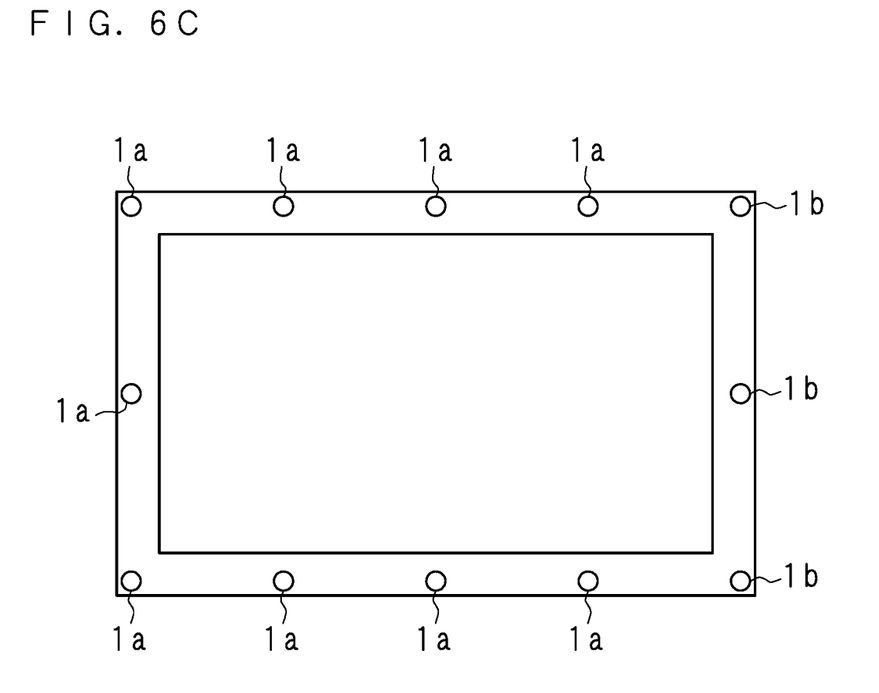
FIG. 6C is a schematic view illustrating an example of a combination of a plurality of fastening members.
Figure 6D:
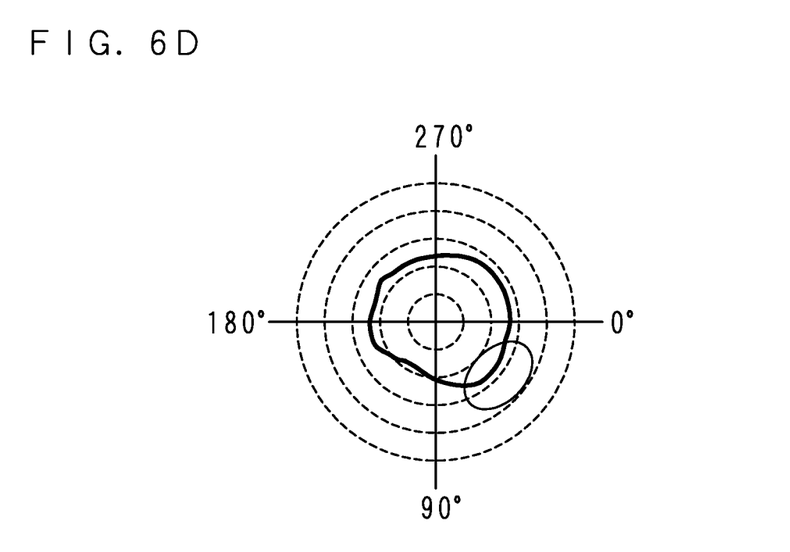
FIG. 6D is a strength distribution diagram of the improved electromagnetic wave noise.

In the example illustrated in FIG. 6B, the electromagnetic wave noise from the display apparatus is strong (i.e., the EMI is deteriorated) in a state that the rotation angle θ is about 45°, that is, a right side of the display screen approaches the measurement antenna than a left side, as illustrated in FIG. 6A. In the case of such a display apparatus, as illustrated in FIG. 6C, the fastening locations of three locations provided on the right short side of the bezel 2 are fastened by the fastening members 1b, and the other locations are fastened by the fastening members 1a. FIG. 6C is a schematic view illustrating an example of the combination of a plurality of fastening members 1. FIG. 6D is a strength distribution diagram of the improved electromagnetic wave noise, and illustrates the amount of radiation of the electromagnetic wave noise from the display apparatus using the fastening members 1a and 1b as illustrated in FIG. 6C. According to the strength distribution illustrated in FIG. 6D, it can be seen that, when the rotation angle θ of the display apparatus is about 45°, the EMI is improved. Accordingly, in the case of the display apparatus from which the electromagnetic wave noise is radiated as illustrated in FIG. 6B, by fastening the fastening locations of the right short side of the bezel 2 by the fastening members 1b different from the other fastening locations (fastening members 1a), the EMI can be suppressed as illustrated in FIG. 6D.

Figure 7A:
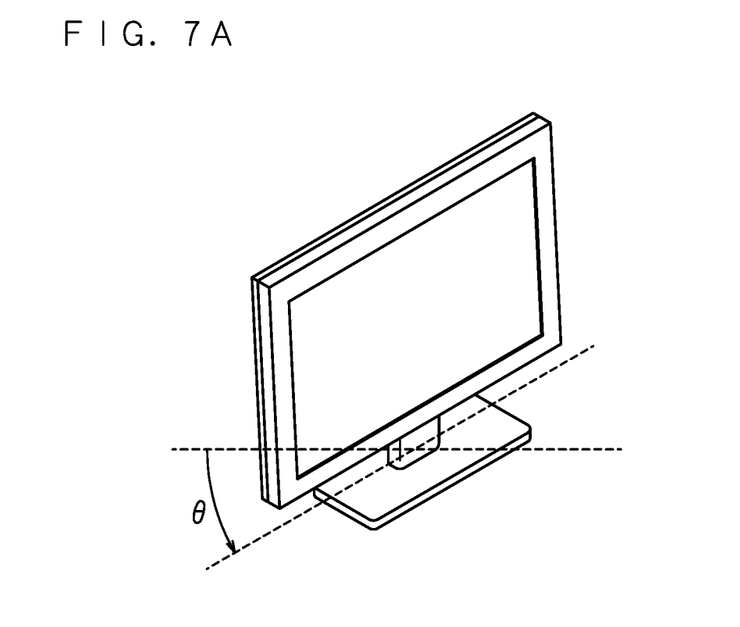
FIG. 7A is a schematic view for describing a method of measuring an electromagnetic wave noise radiated from the display apparatus.
Figure 7B:
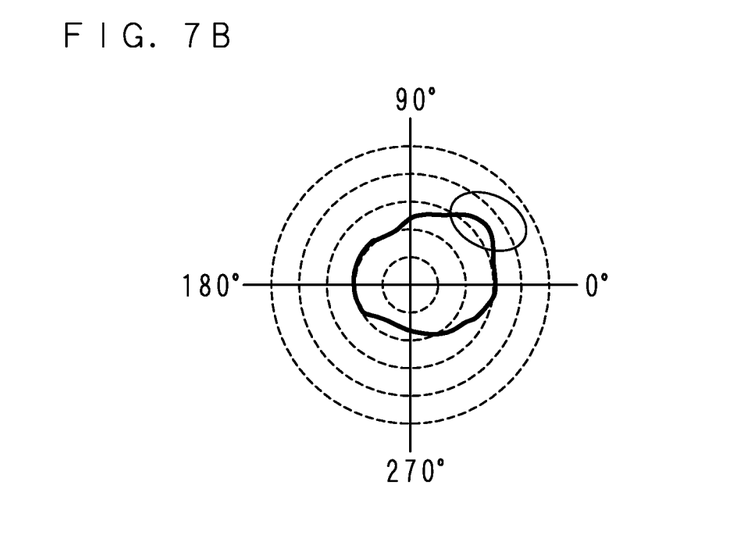
FIG. 7B is a strength distribution diagram of the electromagnetic wave noise.

Next, another detailed example of the method of determining a fastening member 1a or 1b to be attached to each fastening location will be described. FIG. 7A is a schematic view for describing the method of measuring an electromagnetic wave noise radiated from the display apparatus. Also in the measuring method illustrated in FIG. 7A, the display apparatus is installed with the display screen being erected, and a measurement antenna for measuring a strength (the amount of radiation) of the electromagnetic wave is installed at a position separated from the display screen at about several meters (for example, 3 m). Then, the display apparatus is operated, and the electromagnetic wave noise radiated from the display apparatus is measured by the measurement antenna while sequentially changing an orientation of the display apparatus in a direction illustrated by an arrow in FIG. 7A. Further, in the method illustrated in FIG. 7A, the display apparatus is rotated in a counterclockwise direction when viewing the display apparatus from the upper side (i.e., the display orientation is changed). FIG. 7B is a strength distribution diagram of the electromagnetic wave noise, and illustrates, for the display apparatus in which all the fastening locations are fastened by the fastening members 1a, a strength distribution example of the electromagnetic wave noise measured by the method illustrated in FIG. 7A. In FIG. 7B, a circumferential direction of a circle illustrated by a broken line shows a rotation angle θ of the display apparatus, and a radial direction from a center of the circle shows the electric field strength value representing the amount of radiation of the electromagnetic wave noise.

Figure 7C:
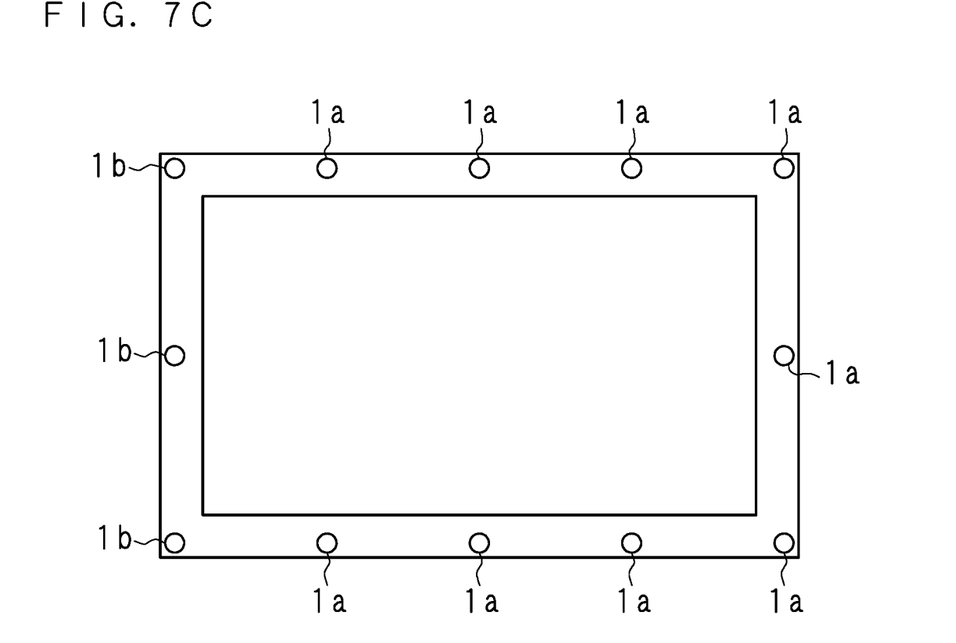
FIG. 7C is a schematic view illustrating an example of a combination of a plurality of fastening members.
Figure 7D:
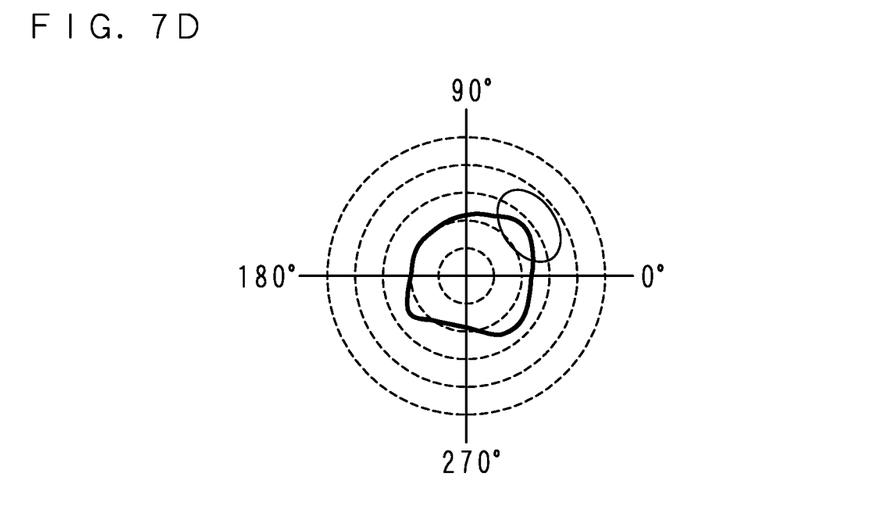
FIG. 7D is a strength distribution diagram of the improved electromagnetic wave noise.

In the example illustrated in FIG. 7B, the electromagnetic wave noise from the display apparatus is strong (i.e., the EMI is deteriorated) in a state that the rotation angle θ is about 45°, that is, the left side of the display screen approaches the measurement antenna than the right side, as illustrated in FIG. 7A. In the case of such a display apparatus, as illustrated in FIG. 7C, the fastening locations of three locations provided on the left short side of the bezel 2 are fastened by the fastening members 1b, and the other locations are fastened by the fastening members 1a. FIG. 7C is a schematic view illustrating an example of the combination of a plurality of fastening members 1. FIG. 7D is a strength distribution diagram of the improved electromagnetic wave noise, and illustrates the amount of radiation of the electromagnetic wave noise from the display apparatus using the fastening members 1a and 1b as illustrated in FIG. 7C. According to the strength distribution illustrated in FIG. 7D, it can be seen that, when the rotation angle θ of the display apparatus is about 45°, the EMI is improved. Accordingly, in the case of the display apparatus from which the electromagnetic wave noise is radiated as illustrated in FIG. 7B, by fastening the fastening locations of the left short side of the bezel 2 by the fastening members 1b different from the other fastening locations (fastening members 1a), the EMI can be suppressed as illustrated in FIG. 7D.

In the above-described Embodiments, for the display apparatus according to the present invention, the display apparatus having the edge light type light source device has been described as an example, but the present invention may also be applied to the display apparatus having a direct type light source device.

The embodiments disclosed herein are to be construed as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

The invention claimed is:

1. A display apparatus comprising:
   a display panel having a display region to display an image on a front surface thereof;
   a holding member which holds the display panel from a back surface side of the display panel;
   a frame member which abuts a peripheral edge part of the front surface of the display panel; and
   a plurality of fastening members which fasten the holding member and the frame member at a plurality of fastening locations,
   wherein the plurality of fastening members comprise:
      one or more first fastening member having a first electrical resistance value; and
      one or more second fastening member having a second electrical resistance value different from the first electrical resistance value, and
      an arrangement of the plurality of fastening members to be attached to the plurality of fastening locations is determined so that a resonance frequency of the display apparatus does not coincide with a frequency of an electromagnetic wave noise radiated from the display apparatus.

2. The display apparatus according to claim 1, wherein the first fastening member and the second fastening member are made of different materials from each other.

3. The display apparatus according to claim 1, wherein
   the frame member has a rectangular shape,
   the plurality of fastening locations are provided along each of four sides of the frame member,
   the first fastening member is arranged at one or more first fastening location provided along one side of the frame member among the plurality of fastening locations, and the second fastening member is arranged at one or more second fastening location except for the first fastening location among the plurality of fastening locations.

4. The display apparatus according to claim 1, wherein the holding member and the frame member are made of a conductive member.

5. The display apparatus according to claim 1, wherein the frame member has a rectangular shape,
three or more fastening locations are provided along each side of the frame member, respectively,
the first fastening member s arranged at one fastening location among the three or more fastening locations provided along each side of the frame member, respectively, and
the second fastening members are arranged at two or more fastening locations except for the one fastening location among the three or more fastening locations provided along each side of the frame member, respectively.

6. The display apparatus according to claim 5, wherein
three or more and odd numbers of fastening locations are provided along each side of the frame member, respectively,
the one fastening location is located at a center of the three or more and odd numbers of fastening locations.

7. The display apparatus according to claim 6, wherein
the three or more and odd numbers of fastening locations are provided at equal intervals.

8. The display apparatus according to claim 1, wherein a washer is not present between the first fastening member and the frame member.

9. The display apparatus according to claim 1, wherein a washer is not present between the second fastening member and the frame member.

* * * * *